J. F. CRAVEN.
MEASURING AND CAN FILLING MACHINE.
APPLICATION FILED JUNE 25, 1909.
1,036,965.
Patented Aug. 27, 1912.
3 SHEETS—SHEET 2.
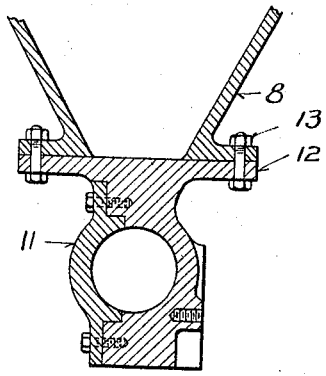
Fig. 3.
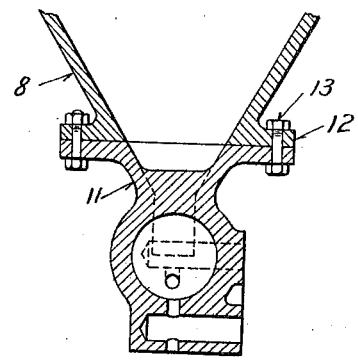
Fig. 4.
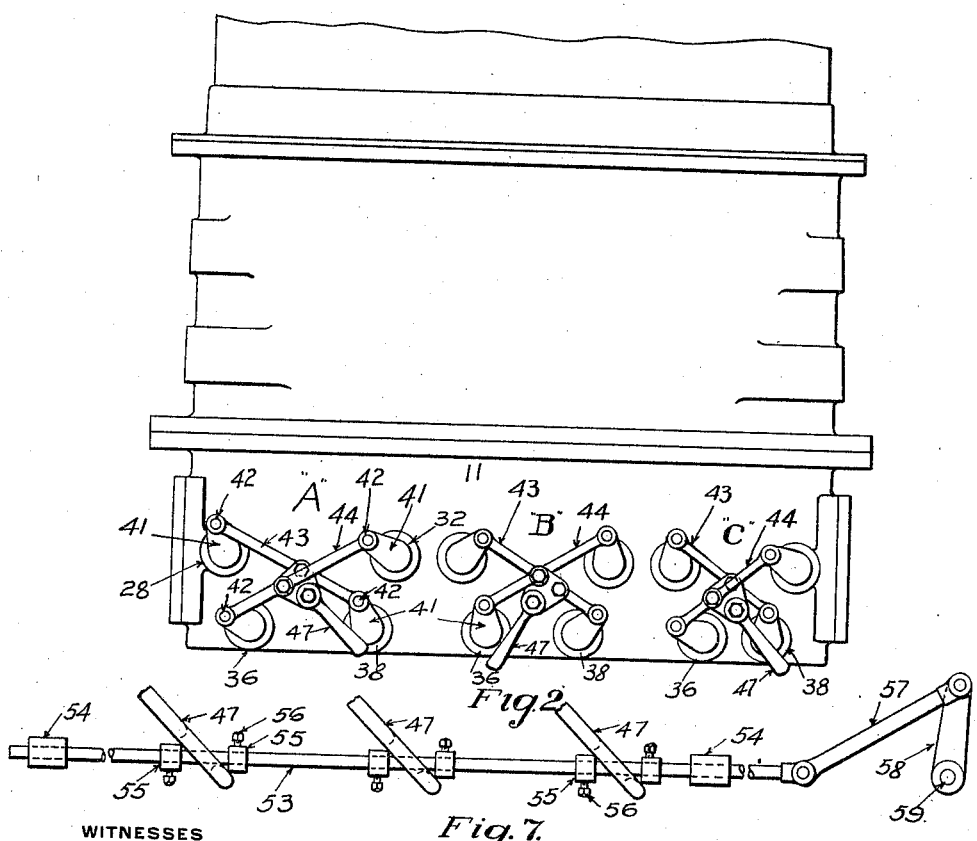
WITNESSES
INVENTOR
James F. Craven J. F. CRAVEN.
MEASURING AND CAN FILLING MACHINE.
APPLICATION FILED JUNE 25, 1909.

1,036,965.

Patented Aug. 27, 1912.
3 SHEETS—SHEET 3.

WITNESSES

INVENTOR

UNITED STATES PATENT OFFICE.

JAMES F. CRAVEN, OF PITTSBURGH, PENNSYLVANIA.

MEASURING AND CAN-FILLING MACHINE.

1,036,965.  Specification of Letters Patent.  Patented Aug. 27, 1912.

Application filed June 25, 1909. Serial No. 504,281.

*To all whom it may concern:*

Be it known that I, JAMES F. CRAVEN, a resident of Pittsburgh, in the county of Allegheny and State of Pennsylvania, have invented a new and useful Improvement in Measuring and Can-Filling Machines, of which the following is a specification.

This invention relates to measuring and filling mechanism, and more particularly for measuring a given quantity of liquid or semi-fluid substances such as oils, greases and the like and filling the same into cans or other receptacles.

The object of the invention is to provide apparatus for this purpose whereby uniform quantities of material are filled into the receptacles, whereby different quantities of material can be measured in order to fill different sized receptacles, which is simple of operation and cannot get out of order, and one having a large capacity, that is, capable of measuring and delivering a charge of material in a short period of time.

A further object of the invention is to provide an improved construction which will permit of quick and easy assembling and disassembling of the parts in construction and for renewal, repair and cleaning of the apparatus.

The invention comprises apparatus constructed and operating as hereinafter described and claimed.

Figure 1:
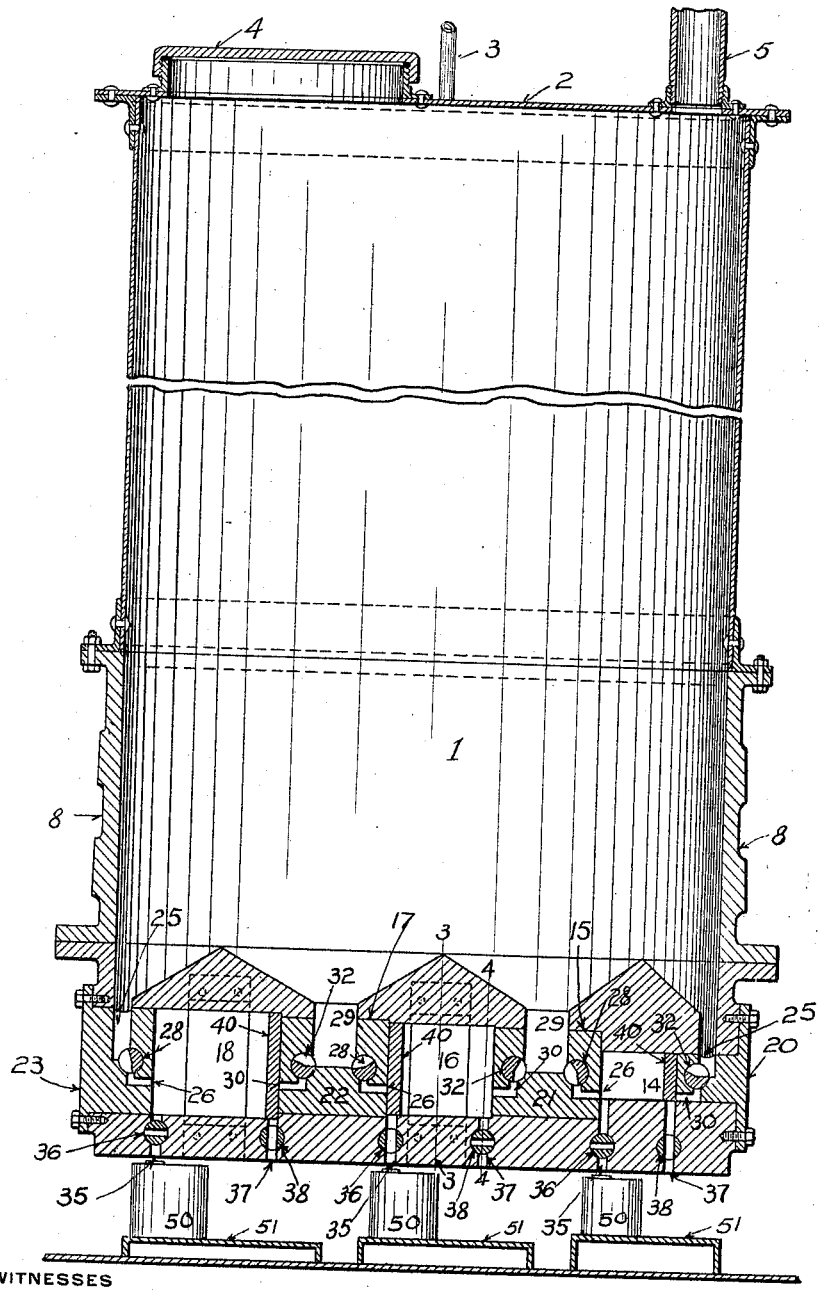
Figure 5:
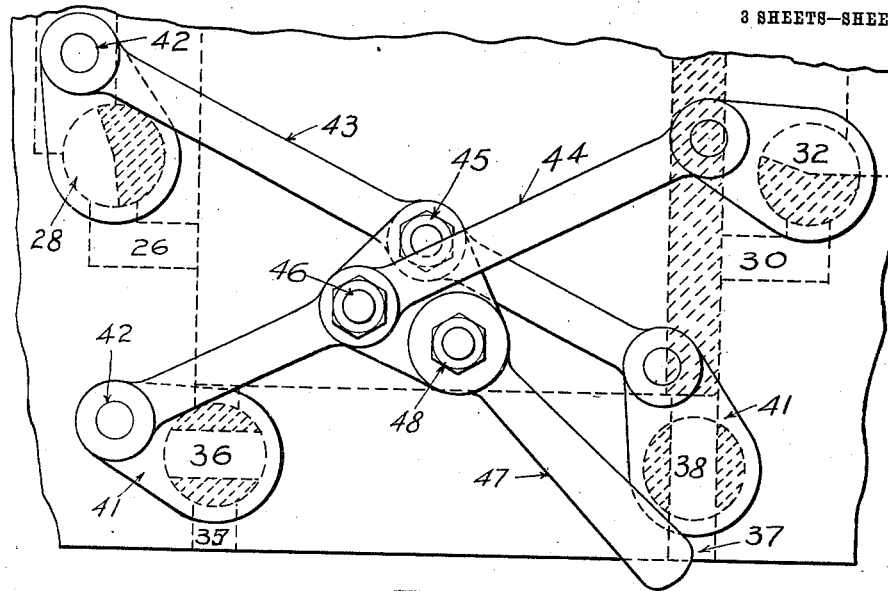
Figure 6:
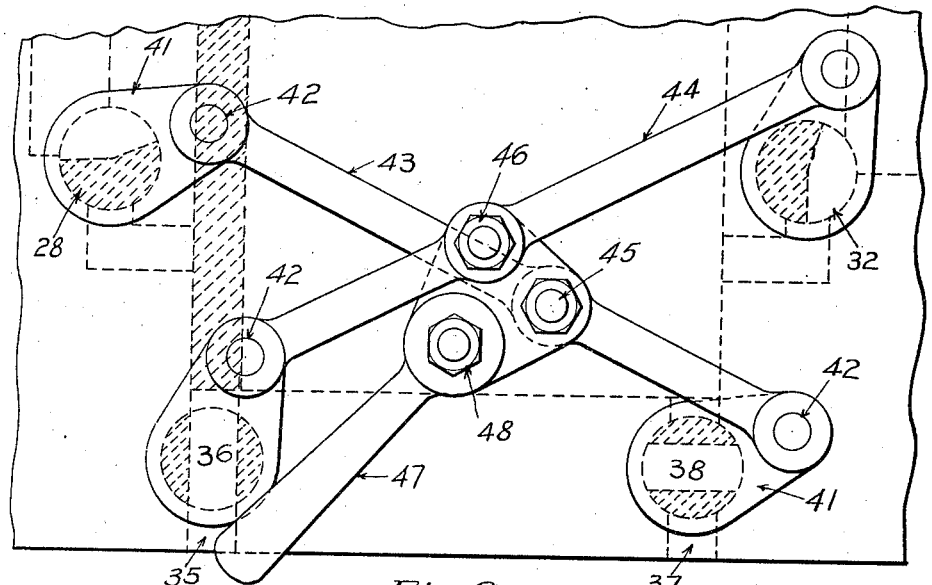

In the accompanying drawing Figure 1 is a longitudinal vertical section through the apparatus; Fig. 2 is a side view of the bottom portion thereof; Figs. 3 and 4 are transverse sections taken respectively on the lines 3—3 and 4—4, Fig. 1; Figs. 5 and 6 are diagrammatic sectional views of one set of valves and their operating mechanism showing the same in the two different positions; and Fig. 7 is a diagrammatic view illustrating automatic mechanism for operating the valves.

In the drawings 1 represents a suitable reservoir or tank for containing the material to be measured and filled into receptacles. This may be of any cross-sectional shape and height and may be provided with any suitable means for exerting pressure on the material contained therein. Such means preferably is a fluid pressure medium, such as compressed air. The top of said tank or reservoir is closed by head 2 provided with a pipe opening 5 through which the material can be filled into said reservoir, and with a manhole which is adapted to be tightly closed by cover 4. The head is also provided with an opening to which is connected a pipe 3 coming from any suitable source of fluid pressure of the required tension to feed the material through the measuring and cut off valves. The bottom portion 8 of the reservoir is hopper shaped, having the side portions sloping downwardly and toward each other and forming a substantially V shaped longitudinal hopper. At the bottom of this hopper is located the measuring and delivery mechanism. In the particular apparatus shown there are three sets of measuring and delivery valves provided for delivering three different quantities of material, namely the set A for delivering a large quantity of material, set B for delivering a smaller quantity of material and a set C for delivering a still smaller quantity of material. A single set of such measuring and delivering valves would constitute a complete apparatus, or if desired the apparatus might embody even a larger number of sets of measuring and delivery valves than three. These measuring and delivery valves are located in a casting 11 which forms the bottom or hopper portion of the reservoir. The bottom 11 may be integral with the reservoir itself, but preferably is a separate piece secured to the lower end thereof, such as by flanges 12 and 13, thereby enabling the measuring and delivery valves to be removed and replaced by others, to either vary the quantities of material which may be measured and delivered by the machine or to enable the same reservoir to be used for substances of different grades or characters and without the necessity of cleaning out the measuring and delivering valves.

As shown the casting 11 is provided with a longitudinal bore having portions of different diameters and marked respectively 14, 15, 16, 17 and 18, increasing in size in the order enumerated. The outer end of the small bore 14 is closed by a plug or block 20, while the bores 15 and 17 are filled by plugs or blocks 21 and 22 respectively, and the outer end of bore 18 is closed by the plug or block 23. The inner ends of bores 14 and 18 and the bore 16 are not filled up, but constitute measuring chambers of different sizes. Each of these chambers is provided with a valve controlled inlet to and outlet from both ends, and as these are uniform for the different measuring chambers, a description of one will suffice. For instance, take the larger measuring chamber 18, or the one on the left-hand side:—The block 23 is provided with a vertical passage 25 which communicates with the hopper of the reservoir, and with a horizontal longitudinal passage 26 opening into the measuring chamber 18. These two passages are connected by the intersecting transverse horizontal bore in which is placed the inlet valve 28 in the form of a rotary plug. On the opposite side of the measuring chamber 18 the plug or block 22 is provided with a vertical passage 29 also communicating with the reservoir and with a horizontal longitudinal passage 30 opening into the chamber 18. These passages are connected by a horizontal transverse bore in which is mounted the rotatable plug valve 32 which is exactly similar to the valve 28 on the opposite side. The passage 29 in plug 22 is also connected through an inlet valve 28 and horizontal longitudinal passage 26 with the measuring chamber 16. The plug 21 is provided with a vertical passage 29 and inlet and outlet valves exactly similar to those in the plug 22, while the end plug 20 is provided with a vertical passage 25 and inlet valve 32 to chamber 14 exactly similar to those correspondingly numbered in plugs 21 and 22. It will thus be seen that each of the measuring chambers is provided on each of its ends with an inlet valve. Each measuring chamber is provided at one end with an outlet passage 35 controlled by valve 36 and at its opposite end with a similar outlet passage 37 controlled by valve 38. In each measuring chamber is located a suitable movable head or plunger shown in the form of a piston 40.

The construction just described and illustrated particularly in Fig. 1, is such that all of the plungers and plugs or blocks may be inserted from one end of the longitudinal bore in the bottom or casting 11. This provides an easy and expeditious means of assembling the parts and at the same time renders it a simple matter to clean them by removal thereof in reverse manner.

The inlet valves 28 and 32 and outlet valves 36 and 38 are provided with suitable passages therethrough, or are cut away suitably so as to either open communication to or from the measuring chamber or close the same, and the operating mechanism for said valves is so arranged that valves 28 and 38 are open at the same time, and while these are open valves 32 and 36 are closed. This operating mechanism may be of various forms and as shown is as follows: Each of the valves on its outer end is provided with a crank arm 41 carrying a wrist pin 42. The wrist pins on the diagonally opposite valves are connected by suitable links; for instance, link 43 connects the inlet valve 28 and outlet valve 38, while link 44 connects the inlet valve 32 and outlet valve 36. Each of these links intermediate its ends is pivotally connected at 45 and 46, respectively, with the broad triangular end of operating handle 47 which is pivotally mounted on the casting 11 at 48, said handle or lever having its end lying between the links 43 and 44. The parts are arranged so that when the handle 47 is to one side as shown in Fig. 5 the inlet valve 28 and outlet valve 38 are open and inlet valve 32 and outlet valve 36 are closed, while when said handle is swung to the opposite position, as shown in Fig. 6, the inlet valve 32 and outlet valve 36 are open and the inlet valve 28 and outlet valve 38 are closed. When the handle is in the intermediate or neutral position inlet valves 28 and 32 are both closed.

The operation of the mechanism described is as follows: Assuming that the reservoir contains a quantity of the material to be measured and filled into receptacles, and that pressure has been applied on top of the same:—If the handle 47 be now moved to the right, or as shown in Fig. 5, it will open inlet valve 28 and outlet valve 38, and the material in the reservoir is forced down into the measuring chamber 18 and drives the plunger 40 to the end of said chamber and entirely fills the chamber. The plunger 40 covers the outlet port 37 and consequently no material can escape, but the chamber will be entirely filled and an exact measured quantity of material thereby secured. The handle is now moved to its opposite position, shown in Fig. 6, closing inlet valve 28 and outlet valve 38 and opening inlet valve 32 and outlet valve 36. The closing of valves 28 and 38 takes place slightly before the opening of valves 32 and 36. The material in the reservoir now enters through valve 32 thereby forcing the plunger over to the opposite end of the measuring chamber 18 and forcing the material in said chamber out through the open valve 36, and filling the chamber on the opposite side of said piston. The handle is again thrown to the right whereupon the valves are again reversed, in which position material again enters through valve 28, driving plunger 40 to the opposite end of chamber 18 and forcing the material in front of the same through outlet valve 38. In this way the mere reversal of the lever causes alternate discharges through valves 36 and 38, and in each case a uniform quantity of material is delivered, namely the exact amount contained in chamber 18.

The foregoing operation applies to each of the sets of valves shown, that is, the operation described with reference to chamber 18 is exactly the same in connection with chambers 14 and 16, the only difference being that on account of the smaller size of chambers 14 and 16 lesser quantities of material are delivered at each operation.

It will be observed that when the handle is in one of its extreme positions the material fills the measuring chamber, but cannot be emptied out of the same until the handle is moved to the opposite position. Consequently the operation of the machine is in no manner affected by the speed at which handle 47 is moved, and the machine operates equally as accurately with a clumsy or slow workman as with a quicker or more experienced one. Also if the workman should accidentally go away from the machine no harm can be done, as no material can possibly escape. It requires no particular skill on the part of the workman, as all he has to do is to place the empty receptacles underneath the discharge openings, move the handle back and forth and shove away the filled receptacles by means of empty ones.

Any form of support may be used for the receptacles. The drawings show cans 50 resting upon a table or platform 51 underneath the machine.

The machine can be readily adapted for power operation. Fig. 7 shows one arrangement for this purpose. The handles 47 are slotted for the passage of a reciprocating rod 53, reciprocating in bearings 54 and provided with collars 55 on each side of each handle 47. The collars are fastened by set screws 56 so that by loosening the same any one or more of the handles 47 will not be operated. The rod 53 can be reciprocated by any suitable mechanism, the drawing showing the same connected by link 57 to crank 58 on a shaft 59 which can be rotated by any suitable means and from any suitable source. With this mechanism the workman will have to attend merely to the placing of empty receptacles and the renewal of the full ones.

The apparatus described is of simple construction, cannot get out of order, or even be put out of order by an ignorant workman. It is especially designed for filling into cans semi-liquid or plastic material, such as thick lubricating greases, but may be used for filling various kinds of materials into various sorts of receptacles.

What I claim is:

1. In a measuring and filling apparatus a supply reservoir, a measuring chamber each end of which is closely adjacent to the supply reservoir, a plunger in the measuring chamber, an inlet connection between the reservoir and measuring chamber at each end of the latter, valves in the inlet connections, an outlet at each end of the measuring chamber, each having a valve therein, and means for operating the valves.

2. In a measuring and filling apparatus a horizontal measuring chamber, a plunger therein, a supply reservoir having portions closely adjacent to the measuring chamber at each end of the latter, inlet connections at the ends of the measuring chamber, valves therein, separate vertical outlets at the ends of the measuring chamber, and means for operating the valves.

3. In a measuring and filling mechanism the combination of a measuring chamber, a supply reservoir having portions closely adjacent to the measuring chamber at each end of the latter, an inlet connection between the reservoir and measuring chamber at each end of the latter, valves in the inlet connections, an outlet at each end of the measuring chamber, each having a valve therein, and a plunger in said chamber actuated by the pressure of the material entering said chamber and arranged to force a charge out of said chamber and in its extreme positions covering the inlet openings.

4. In a measuring and filling mechanism the combination of a measuring chamber provided with an inlet to and an outlet from each end thereof, the inlet at one end and the outlet at the other end constituting an oppositely disposed pair, valves controlling said inlets and outlets, crank arms on the valves, the crank arms of a pair being of the same length and parallel to each other, links each connecting the crank arms of a single pair, means for simultaneously operating both links, and a plunger movable in the measuring chamber the opposite faces of the plunger being of equal superficial area.

5. In a measuring and filling mechanism a reservoir having a bottom, said bottom having a bore with portions of varying diameter, plugs of different diameter in different portions of the bore, plungers of different diameter in other portions of the bore, a closing plug at each end of the bore, valves in the plugs and valves in the bottom, and means for controlling the valves.

6. In a measuring and filling mechanism the combination of a casing having a measuring chamber therein, said chamber being provided with an inlet to each end thereof, the casing being provided at its ends with passages therethrough, said passages communicating with the chamber and being independent of each other and open at their outer ends, said passages forming separate outlets from the chamber, valves in the inlets and valves in the outlets, means for operating said valves, and a piston movable in said chamber and arranged to force equal charges out of opposite ends of said chamber as it reciprocates.

7. In a measuring and filling mechanism the combination of a substantially cylindrical casing forming a wall for an inner chamber, said chamber being provided with an inlet to each end thereof, the casing being provided at its ends with straight passages extending radially therethrough, said passages being independent of each other and open at their outer ends and forming separate outlets from the chamber, valves in the inlets and valves in the outlets, means for operating said valves, and a piston movable in said chamber and arranged to force equal charges out of opposite ends of said chamber as it reciprocates.

In testimony whereof, I have hereunto set my hand.

JAMES F. CRAVEN.

Witnesses:
 WILLIAM I. KING,
 F. W. WINTER.

Copies of this patent may be obtained for five cents each, by addressing the "Commissioner of Patents. Washington, D. C."